United States Patent [19]

Johannes et al.

[11] Patent Number: 4,689,665
[45] Date of Patent: Aug. 25, 1987

[54] GATED CONTROL CIRCUIT

[75] Inventors: Kurt J. Johannes; Jürgen Ruprecht, both of Hamburg, Fed. Rep. of Germany

[73] Assignee: U.S. Philips Corporation, New York, N.Y.

[21] Appl. No.: 787,393

[22] Filed: Oct. 15, 1985

[30] Foreign Application Priority Data

Oct. 20, 1984 [DE] Fed. Rep. of Germany ....... 3438564

[51] Int. Cl.$^4$ .............................................. H04N 9/68
[52] U.S. Cl. .................................... 358/27; 358/174; 307/264
[58] Field of Search ................... 358/27, 38, 35, 21 R, 358/174, 315; 307/264, 358; 364/571; 375/98

[56] References Cited

U.S. PATENT DOCUMENTS

| | | | |
|---|---|---|---|
| 3,972,626 | 8/1976 | Laskowski | 364/571 X |
| 4,028,534 | 6/1977 | Tucker | 307/264 X |
| 4,161,628 | 7/1979 | McRae | 375/98 X |
| 4,191,995 | 3/1980 | Farrow | 307/264 |
| 4,510,521 | 4/1985 | Ruprecht et al. | 358/27 |
| 4,523,223 | 6/1985 | Luder et al. | 358/27 |
| 4,525,741 | 6/1985 | Chahal et al. | 358/174 X |
| 4,539,692 | 9/1985 | Munter | 364/571 X |
| 4,602,276 | 7/1986 | Fling et al. | 358/27 |
| 4,604,645 | 8/1986 | Lewis, Jr. | 358/27 |

Primary Examiner—James J. Groody
Assistant Examiner—Victor R. Kostak
Attorney, Agent, or Firm—Thomas A. Briody; William J. Streeter; Gregory P. Gadson

[57] ABSTRACT

The invention relates to a gated control circuit for controlling an input signal, for example the chrominance signal formed by the color synchronizing signal and the color difference signal of a FBAS signal. The chrominance signal is controlled in dependence on the amplitude of the color synchronizing signal. To that end the color synchronizing signal is applied to an amplitude detector (3), the difference between the output signal of the amplitude detector (3) and a desired value is formed and the result is stored in a register (5). The output signal of the register (5) is applied to a control member (6) having an integrating behavior and including a counter whose counting rate can be changed in dependence on the value of the comparator circuit (4). The chrominance signal and the output signal of the control member (6) are applied to an adjusting member (1, 2), so that the chrominance signal is changed in accordance with the control deviation.

8 Claims, 6 Drawing Figures

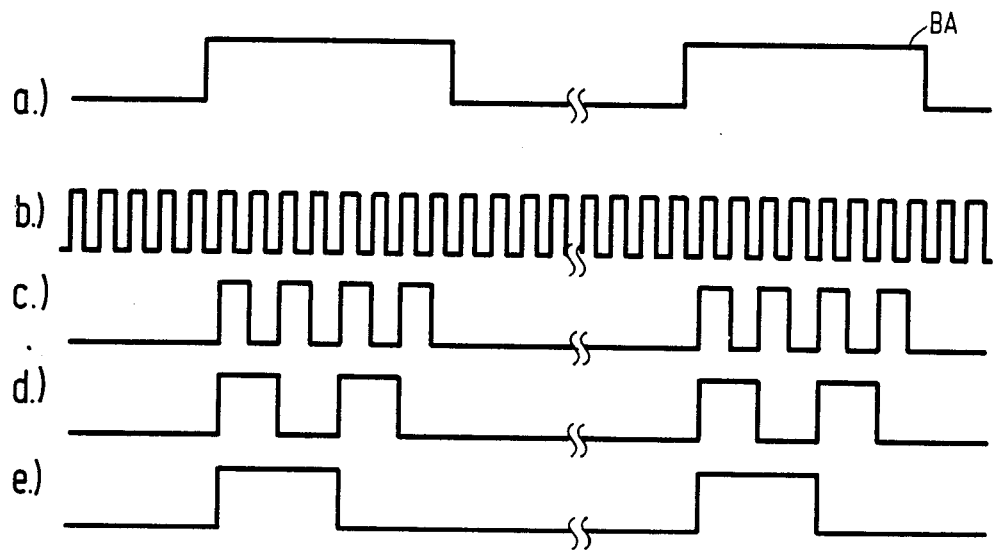
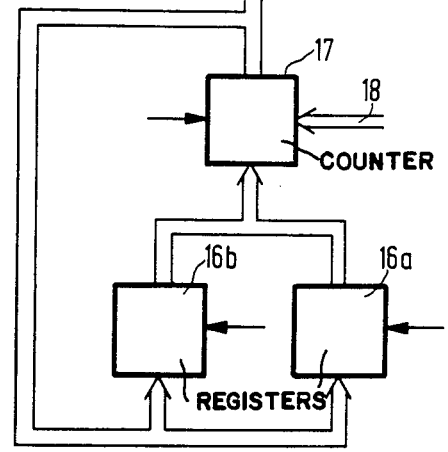
FIG. 4
FIG. 5

GATED CONTROL CIRCUIT

BACKGROUND OF THE INVENTION

The invention relates to a gated control circuit for controlling an input signal available as a sequence of digital data words, including an adjusting member to which the input signal and a setting value are applied, a comparator circuit producing an output signal in accordance with the difference between the output signal of the adjusting member during the gating period and a desired value and a counter, from whose output signal the setting value is derived, to which a clock signal is applied and whose counting direction is controlled in dependence on the sign of the output signal of the comparator circuit.

Such a gated control circuit is disclosed in EP-OS No. 69 856. The gated control circuit is used for controlling the amplitude of the chrominance signal, formed by the picture chrominance signal and the colour synchronizing signal, of an FBAS-signal (television signal). As the chrominance information at the picture tube must be in the correct ratio relative to the luminance signal and the color synchronizing signal always is in a defined ratio to the luminance signal, the amplitude of the chrominance signal is controlled in dependence on the color synchronizing signal. The chrominance signal is applied as a digital signal to the prior art gated control circuit. The detected amplitude of the color synchronizing signal is stored in a hold circuit and the output signal of the hold circuit is applied to a comparator circuit. In the event of an output deviation the counter content is incremented or decremented, respectively by one unit during each gating period, independent of the value of the comparator circuit output signal. A large output deviation is consequently controlled more slowly than a small output deviation as the counting content is changed by the same amount in both cases.

SUMMARY OF THE INVENTION

The invention has for its object to provide a gated control circuit of the type defined in the opening paragraph in which the control can be effected rapidly and with a high degree of accuracy, at little cost.

According to the invention, this object is accomplished in that the counting rate is controlled such, in dependence on the value of the output signal of the comparator circuit that for a high value, the counting rate is high and that it is low for a small value.

Counting rate must here be understood to mean that the counter content is decreased or increased, respectively by a predetermined amount per unit of time, in dependence on the value of the comparator circuit output signal. By adapting the counting rate to different output deviations, these deviations are controlled rapidly so that gated control circuits of this type are suitable for systems in which theh output deviation must be small after a short time.

In accordance with a first further development of the invention a multiplexer is provided which, under the control of the value of the comparator circuit output signal so applies the clock signal of a plurality of counting stages to the counter, that at each clock the counter content is changed for high values by a larger amount than it is changed for low values. The counting rate is changed in this embodiment because the clock signal is applied at a constant frequency to one of the more significant counting stages, so that the less significant counting stages are not operative.

In a second further development of the invention it is provided that the frequency of a clock signal generator producing the clock signal is controlled in dependence on the value of the comparator circuit output signal. In this embodiment the clock signal is always applied to the same counting stage and a change in the counting rate is effected by increasing or decreasing, respectively the clock generator frequency.

The described embodiments of the gated control circuit can be used to advantage, when according to a further embodiment of the invention, the quotient of the counting rate and the value of the comparator circuit output signal is higher for a large amplitude than for a lowr amplitude. A control deviation is eliminated rapidly and very accurately when the quotient is chosen in the above-described manner. A large control deviation is rapidly eliminated, when the quotient is large, and a small control deviation is eliminated more slowly but accurately, when the quotient is small. When in accordance with a variable quotient the counting rate of the counters depends on the control deviation, this corresponds to a control member with integrating action, whose time constant is variable. The choice of the quotient must however be effected such that the sampling control circuit does not become unstable.

A further advantageous embodiment is obtained when the counting direction of the counter is controlled by the sign bit of the digital output signal of the comparison circuit and the multiplexer or the frequency of the clock generator, respectively is controlled by the most significant bits of the digital output signal of the comparison circuit. Because the bits of a lower significance do not affect the control, the overall cost and design effort for the circuit are reduced.

The adjusting member of the gated control circuit may be of such a construction that an amplitude control is obtained. This may be effected in accordance with DE-OS No. 31 36 216, the adjusting member comprising a shift stage and a multiplier, the shift stage in which each sampling value is shiftable through a controllable integral number of positions, receiving the input signal, and the output signal of the shifting stage being applied to the multiplier. In accordance with a further embodiment of the invention the more significant bits of the counter can determine the number of positions to be shifted in the shifting stage and the lower significant bits of the counter may constitute the multiplication coefficient for the multiplier. Splitting the multiplication in a shift effected in the shifting stage, and a subsequent multiplication of the shifted values, results in a very good utilization of the multiplier, as the multiplier only processes significant positions and consequently can be designed for a minumum number of positions.

Special advantages of the invention are obtained when the digital input signal is the digital chrominance signal, constituted by the color synchronizing signal and the picture chrominance signal, of an FBAS-signal (television signal) and the amplitude of the color synchronizing signal is compared in the comparator circuit with a desired value. Thus, the gated control circuit is used to controlling the amplitude of the digital chrominance signal in color television receivers or for controlling the chrominance signal during the recording or display in a video recorder. If the digital chrominance signal is controlled by means of the gated control circuit of a construction in accordance with the first embodiment, the clock signal applied to the counter is advantageously a clock signal of the line frequency. In each line the amplitude of the color synchronizing signal is detected, the comparison between the desired and the actual value is effected and the counter content is changed at the beginning of the subsequent line and kept constant thereafter during one line.

In a further embodiment of the invention it is provided that the chrominance signal of a video recorder is displayed with the aid of a plurality of magnetic heads, that a plurality of registers are provided, whose number is equal to the number of magnetic heads, and that the output signal of the counter is entered after each field in one of the registers and the output signal of one of the other registers is entered in the counter. As the wear of the magnetic heads of the video recorders differ from head to head, a specific control for the signals from each magnetic head must be effected. This embodiment has for its result that at the beginning of a field the content is present which was stored in the counter when the active magnetic head was activated last.

BRIEF DESCRIPTION OF THE DRAWINGS

Embodiments of the invention will now be described in greater detail with reference to the accompanying drawings, in which:

FIG. 4 is a diagram to explain the mode of operation of the control member shown in FIG. 3, FIG. 5 shows an embodiment of a portion of the control member for use in a video recording display device and FIG. 6 is a diagram to explain the mode of operation of the circuit arrangement shown in FIG. 5.

DETAILED DESCRIPTION OF THE INVENTION

Figure 1:
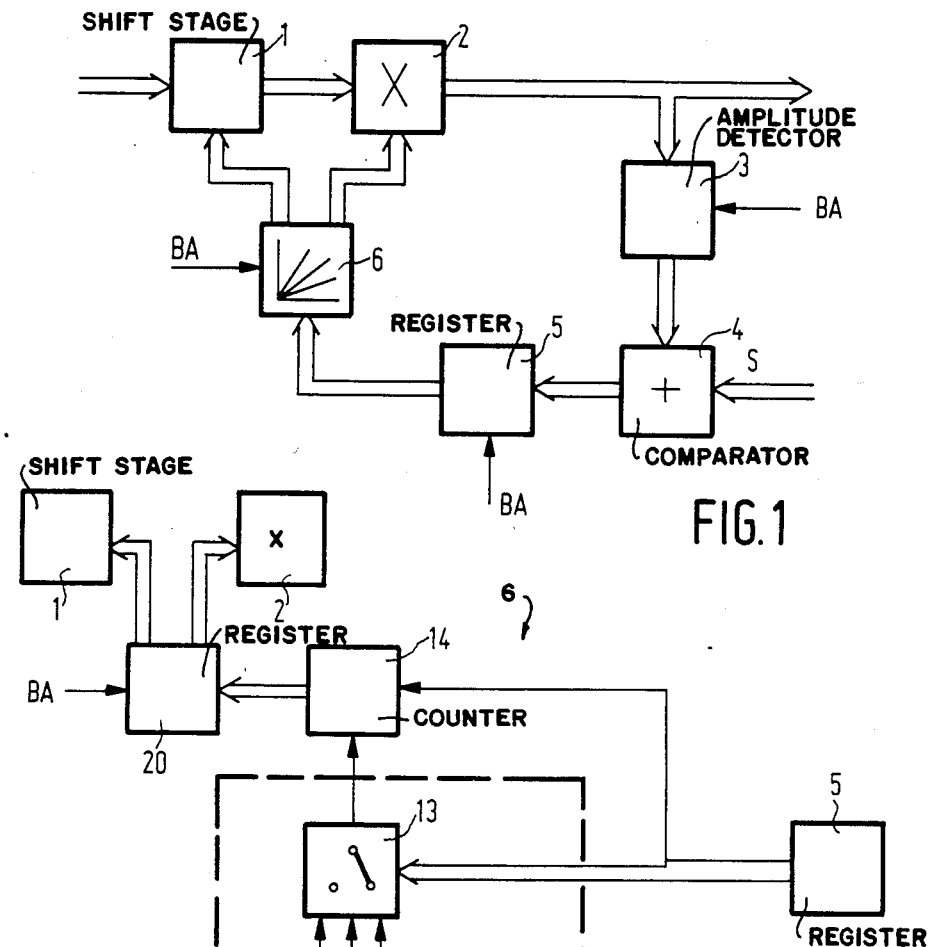
FIG. 1 shows a block diagram of a gated control circuit in accordance with the invention for digital signal processing.

In FIG. 1 the digital chrominance signal formed by the color synchronizing signal and the picture chrominance signal is applied to a shift stage 1 and the output of the shift stage is applied to a multiplier 2. The digital chrominance signal was sampled at four times the color subcarrier frequency, that is to say at 17.7 MHz. The output signal of the multiplier 2 which has, for example, a resolution of 8 bits, is the output signal of the gated control circuit and the input signal of an amplitude detector 3. In a comparator circuit 4 the difference between the output signal of the amplitude detector 3 and a desired value S is formed. The output signal of the comparison circuit 4 is applied to a register 5 and, subsequent thereto, is applied to a control member 6 with integrating action. Two outputs of the control member 6 are connected to the shift stage 1 and the multiplier 2. The amplitude detector 3, the register 5 and the control member 6 additionally receive control signals.

The mode of operation of the shift stage 1 and the multiplier 2 is extensively described in German Offenlegungsschrift No. 3136216. The control member 6 applies to the shift stage 1 control signals which characterize the number of positions to be shifted. The multiplier 2 receives the multiplication coefficient from the control member 6. The maximum amplitude of the color synchronizing signal is detected in the amplitude detector 3 or the amplitude mean value of the color synchronizing signal is formed, as the control is effected in dependence on the amplitude of the color synchronizing signal. The amplitude detector 3 is energized by the positive edge of a color synchronizing-blanking pulse BA. The line-frequency pulses BA which act as gating signals, start before the color synchronizing signal and do not end until after the end of this color synchronizing signal. The amplitude detector 3 is then made inoperative by applying the negative edges of the pulses BA.

DE-OS No. 31 36 216 describes embodiments of the amplitude detector. The control deviation is detected in the comparator circuit 4, which may be in the form of an adder when the desired value S has a negative sign. The result of the adding operation is stored in the register 5 after the negative edge of the pulse BA. The data stored in register 5 can now be transferred to the control member 6. It is alternatively possible to arrange the register 5 before the comparator circuit 4.

Figure 2:
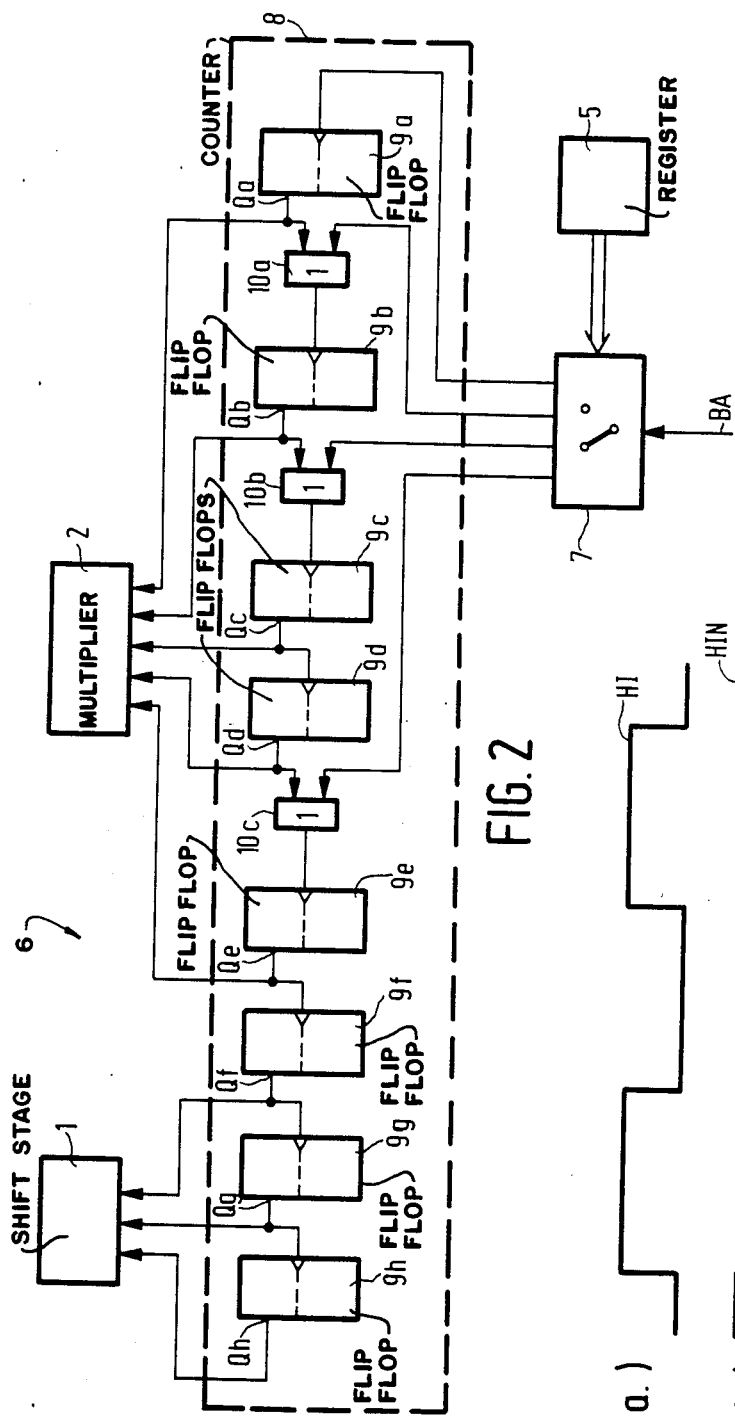
FIG. 2 shows a first embodiment of the control member 6 of FIG. 1.

FIG. 2 shows a first embodiment of the control member 6 which has an integrating action. The output signal of the register 5 and the pulses BA are applied to a multiplexer 7, which is connected to a counter 8. In this embodiment the essential circuit elements of an 8-stage up/down asynchronous counter are shown, which illustrate the mode of operation of the control member according to the invention. This counter comprises eight flip-flops $9a$ to $9h$ and three OR-gates $10a$ to $10c$. A line of the multiplexer 7 is connected to the clock input of the flip-flop $9a$, whose output Qa is connected to an input of an OR-gate $10a$. A further line of the multiplexer 7 leads to the second input of the OR-gate $10a$. The output of the OR-gate $10a$ is connected to the clock input of the flip-flop $9b$. The output Qb of the flip-flop $9b$ and a third line of the multiplexer 7 are connected to an OR-gate $10b$, whose output is connected to the clock input of a third flip-flop $9c$. The output Qc of the flip-flop $9c$ is connected to the clock input of a fourth flip-flop $9d$, whose output Qd and a fourth line of the multiplexer 7 are connected to an OR-gate $10c$. The output of the OR-gate $10c$ is connected to the clock input of the flip-flop $9e$, whose output Qe is connected to the clock input of the flip-flop $9f$. In a similar way the flip-flops $9g$ and $9h$ follow after the flip-flop $9f$.

In addition, the outputs Qa to Qe are connected to the multiplier 2 and the outputs Qf to Qh to the shift stage 1.

Via the multiplexer 7 a pulse BA is applied through one of the four lines to the corresponding counting stage. If the pulse BA is always applied only to the flip-flop $9a$, then the counter operates as the known asynchronous counters and the counter content is increased by one unit. If however the pulse BA is applied via the OR-gate $10a$, then only the counter content in flip-flop $9b$ and the subsequent flip-flops can change. The content of the flip-flop $9a$ remains unchanged. The counter content is then incremented by two units. If the pulse BA is only applied to the OR-gate $10b$ or $10c$, then the counter content always changes by four units or sixteen units. As a result thereof the quotient is for a large control deviation larger than for a small control deviation. As four different counting rates can be selected by the counter, the multiplexer requires only a 2-bit information for selecting one of the four lines. For that reason only the two most significant bits of the output signal from the comparison circuit 4 are applied to the multiplexer. As described in the foregoing, only the circuit components of the counter which are of fundamental interest for the invention are shown. In this embodiment the counter is shown as being an up-counter only. By using known measures, this counter can be extended to an up-down counter. To determine the counting direction, the sign bit of the output signal of the comparison circuit 4 is then applied to the counter. In a similar simple way it is possible to extend the counter by means of additional stages and to increase or decrease the number of counting rates. The counting content of the first five counting stages now constitutes the multiplying coefficient for the multiplier 2 and the counting input of the last three stages supplies the shift stage with information about the number of positions to be shifted. If the counting content must not be changed every line, then less significant counting stages may be added, which are not connected to the multiplier. It is alternatively possible to realize the counter as a synchronous counter.

The control is characterized by the following chronological sequence:

After the leading edge of a pulse BA the amplitude of the color synchronizing signal is determined in the amplitude detector 3 until the end of the pulse. Thereafter the comparison is effected and the output signal is stored in the register 5. The counting content is changed by the leading edge of the next pulse BA. Subsequent thereto the chrominance signal is multiplied by the new setting value.

Figure 3:
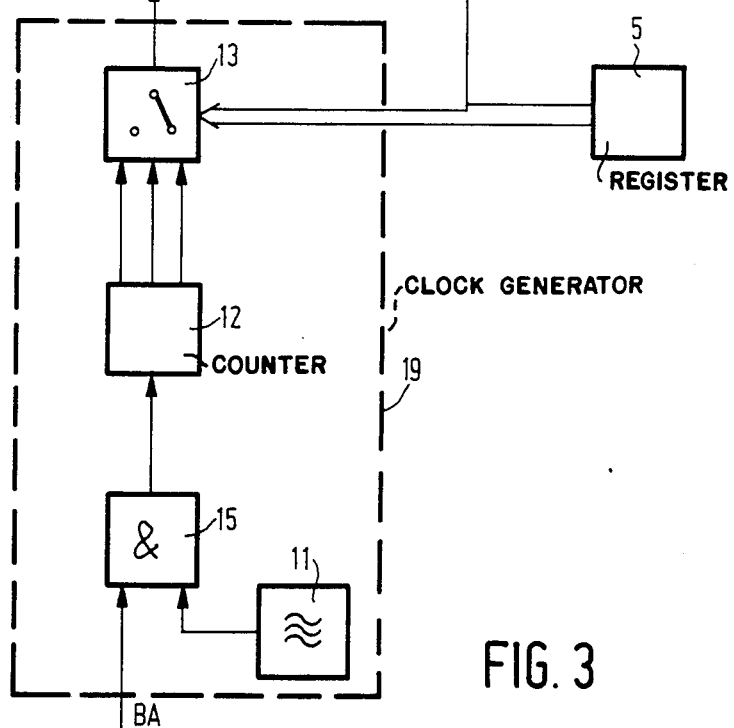
FIG. 3 shows a second embodiment of the control member 6 of FIG. 1.

FIG. 3 shows a second embodiment of the control member 6 with integrating behavior. A clock generator 19 is connected to the register 5 and receives the pulses BA on a control line. The clock signal produced by the clock generator 19 are applied to a counter 14. A further input of the counter 14, via which the counting direction is controlled is connected to an output of the register 5. The output signal of the counter 14 is applied to a register 20, whose several outputs are connected to the multiplier 2 and to the shift stage 1. Likewise the register 20 receives the pulses BA at a further input. The counter may be a commercially available up/down counter. The clock generator 19 comprises an oscillator 11 generating a clock signal whose frequency corresponds to a multiple of the line frequency, and AND-gate 15, a counter 12 and a demultiplexer 13. The clock signal from the oscillator 11 and the pulses BA are applied to the AND-gate 15. The output signal of the AND-gate 15 is applied to the counter 12 whose output signals are applied to a demultiplexer. Further inputs of the demultiplexer 13 are connected to the register 5. The output signal of the demultiplexer 13 is applied to the counter 14.

The mode of operation of the second embodiment of the control member 6 can be illustrated by means of FIG. 4. In line a of FIG. 4, the pulses BA and in line b the clock signal of the oscillator 11 are represented. The clock signal is only applied to the counter 12 via the AND-gate when the pulse BA occurs. The counter 12 comprises a pluality of counting stages which divide the frequency of the clock generator 11 in a known manner. The output signal of a counting stage of the counter 12, which signal is formed by four pulses only during the period of time in which the pulse BA occurs, is shown in line c of FIG. 4. Line d of FIG. 4 shows a further output signal which always contains two pulses and the third output signal is shown in line e, which signal is always constituted by one pulse. In dependence on the value of the output signal of the comparator circuit the demultiplexer 13 is switched in such a manner that one of the output signals of the counter 12 is applied to the counter 14. If the output signal shown in line c of FIG. 4 is applied to the counter 14, then the counting content is decreased or increased, respectively by four units, as the counting input changes in response to each leading edge of the clock signal. The counting direction depends on the sign of the comparator circuit signal. The linefrequency clock signal may have any optional value. Advantageously, the frequency of the clock signal is equal to the gating frequency.

The control performed by the second shown in FIG. 3 is characterized by the following chronological sequence:

The sequence of operations differ from the sequence in the first embodiment only after the output signal of the comparator circuit 4 has been stored in the register 5. During one line the amplitude has been detected, the comparison operation been effected and the output signal of the comparator circuit been stored in the register 5. After the leading edge of the subsequent pulse BA the counter content is changed until the end of the pulse BA. The counting content is entered into the register 20 by means of the trailing edge of the pulse BA. The new setting value, stored in the register 20, is now multiplied by the chrominance signal.

With this embodiment the counter content can also be changed by an amount not being a power of two, as the counter content depends on the number of pulses of the clock signal. Thus, alternatively quotients may be chosen which increase linearly versus the control deviation.

When there is no control deviation, the counting content is changed in the present embodiment during each line by the lowest counting rate. The counter content consequently fluctuates by a given amount. The circuit can however be modified such that when there is no control deviation, the counting content does not change any more. To that end it is, for example, possible to provide a switch in the line, which applies the clock signal to the counter. The switch is connected to a logic circuit and this logic circuit is connected to the outputs of the comparator circuit. The logic circuit now so controls the switch that it is only closed in the event of a control deviation.

The stability of the gated control circuit depends on the counting rate. The counting rate must not be chosen such, that the output signal of the adjusting member (the actual value) is changed for more than 100%, as than the system becomes unstable.

FIG. 5 shows an embodiment of the control member 6 with integrating behavior, which provides special advantages for the control of chrominance signals in the display section of a video recorder. The data output of the counter 17, which may be of the same construction as the counter 8 or the counter 14, is connected to the data inputs of two registers 16a and 16b and to the shift stage 1 and the multiplier 2. The data outputs of the two registers 16a and 16b are connected to the data inputs of the counter 17. In addition, the signals from multiplexer 7 or demultiplexer 13, respectively and the signal for setting the counting direction are applied to the counter 17 via the connection 18. In addition, the two registers 16a and 16b and the counter 17 receive control pulses.

For commercially available counters it is possible to preset the counting content by applying a data word.

To that end, an enable signal must however be applied to the corresponding data input of the counter. For video recorders having two magnetic heads, the magnetic head is changed from field to field, As the two magnetic heads have different transmission characteristics due to, for example, different wear, the control of the signals for these magnetic heads is also different. The field pulse (pulse HI) available in a video recorder or a television set is used to control this circuit arrangement. A control circuit, not further described here, produces pulses HD, which are derived from the pulses HI, have twice the frequency of the pulses HI and are shifted through a certain time relative to the pulses HI.

Figure 6:
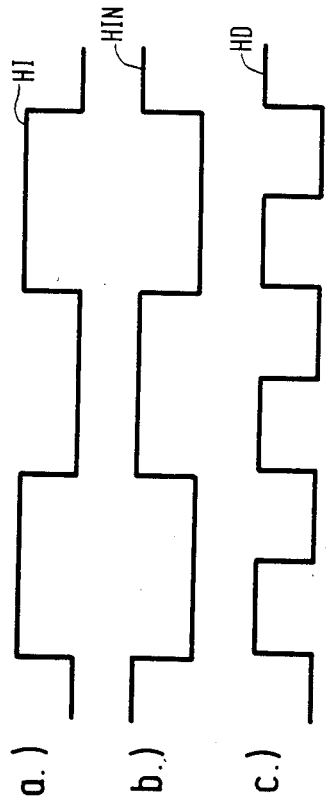

In FIG. 6, impulses HI are shown in line a, inverted pulses HI (pulses HIN) are shown in line b and the pulses HD are shown in line c. The pulses HI are applied to the clock input of the register 16a and the pulses HIN to the clock input of the register 16b. The data stored in the two registers are made available by an enable signal. To that end, a pulse HIN is applied to the register 16a and a pulse HI to the register 16b. The data input of the counter 17 is enabled in response to the leading edge of the pulse HD applied to the counter 17 and a new counting position is preset. At the beginning of a field the counting position is stored in the register 16a by the leading edge of a pulse HI. The stored data of the register 16b are released and transferred to the counter 17 after the appearance of the enable pulse. At the beginning of the subsequent field the counting content is transferred to the register 16d in response to the leading edge of the pulses HIN and in response to the leading edge of the pulse HD the counting content is transferred to the counter 17 after the data in the register 16a have been released. This procedure is repeated in the subsequent field. The advantage of this circuit arrangement is that a new control need not start at each magnetic head change, but that the control can be continued using the stored values now again contained in the counter.

The registers can be arranged sequentially, so that the counting content is first always stored in the same register and is then shifted further into the other register.

What is claimed is:

1. A gated control circuit for controlling an input signal available at a sequence of digital data words, including an adjusting member (1, 2) to which the input signal and a setting value for setting an adjusting member (1, 2) are applied, a comparator circuit (4) producing an output signal in accordance with the difference between the output signal of the adjusting member (1, 2) during the gating period and a desired value, and a counter (8, 14, 17) from whose output signal the setting value is derived, to which a clock signal is applied and whose counting direction is controlled in dependence on the sign of the output signal of the comparator circuit (4) characterized in that the counting rate is controlled such, in dependence on the value of the output signal of the comparator circuit (4) that for a high value the counting rate is high and that the counting rate is low for a low value, and further comprising a multiplexer (7) which, controlled by the value of the output signal of the comparator circuit (4) so applies the clock signal to several counting stages of the counter (8, 14, 17), that at each clock the counting content is changed by a larger amount for high values than for low values.

2. A gated control circuit for controlling an input signal available at a sequence of digital data words, including an adjusting member (1, 2) to which the input signal and a setting value for setting an adjusting member (1, 2) are applied, a comparator circuit (4) producing an output signal in accordance with the difference between the output signal of the adjusting member (1, 2) during the gating period and a desired value, and a counter (8, 14, 17) from whose output signal the setting value is derived, to which a clock signal is applied and whose counting direction is controlled in dependence on the sign of the output signal of the comparator circuit (4) characterized in that the counting rate is controlled such, in dependence on the value of the output signal of the comparator circuit (4) that for a high value the counting rate is high and that the counting rate is low for a low value, and further characterized in that the frequency of a clock generator (19) producing the clock signal is controlled in dependence on the value of the output signal of the comparator circuit (4).

3. A gated control circuit as claimed in claims 1 to 2, characterized in that the quotient of the counting rate and the value of the output signal of the comparator circuit (4) is higher for a high value than for a low value.

4. A gated control circuit as claimed in either of claims 1 or 2, characterized in that the counting direction of the counter (8, 14, 17) is controlled by the sign bit of the digital output signal of the comparator circuit, and the multiplexer (7) or the frequency of the clock generator (19), respectively is controlled by the most significant bits of the digital output signal of the comparator circuit (4).

5. A gated control circuit as claimed in either of the claims 1 or 2, the adjusting member comprising a shift stage (1) and a multiplier (2), that the input signal is applied to the shift state (1) in which each sampling value is capable of being shifted through a controllable integral number of positions, and that the output signal of the shift stage (1) is applied to the multiplier (2), characterized in that the more significant bits of the counters (8, 14, 17) determine the number of positions to be shifted in the shift stage (1) and the less significant bits of the counter (8, 14) constitute the multiplication coefficient for the multiplier (2).

6. A gated control circuit as claimed in either of claims 1 or 2, characterized in that the digital input signal is the digital chrominance signal formed by the color synchronizing signal and the color difference signal of a FBAS signal (television signal) and the amplitude of the color synchronizing signal is compared in the comparator circuit (4) with a desired value.

7. A gated control circuit as claimed in claim 6, characterized in that the clock signal applied to the counter (8, 14, 17) is a clock signal of the line frequency.

8. A gated control circuit as claimed in of claims 1 or 2, characterized in that the chrominance signal is displayed by a video recorder having a plurality of magnetic heads, that a plurality of registers (16a, 16b) are provided, whose number is equal to the number of magnetic heads and that after each field the output signal of the counter (17) is entered into one of the registers (16a) and the output signal of one of the other registers (16b) is entered into the counter (17).

* * * * *